Figure 1:
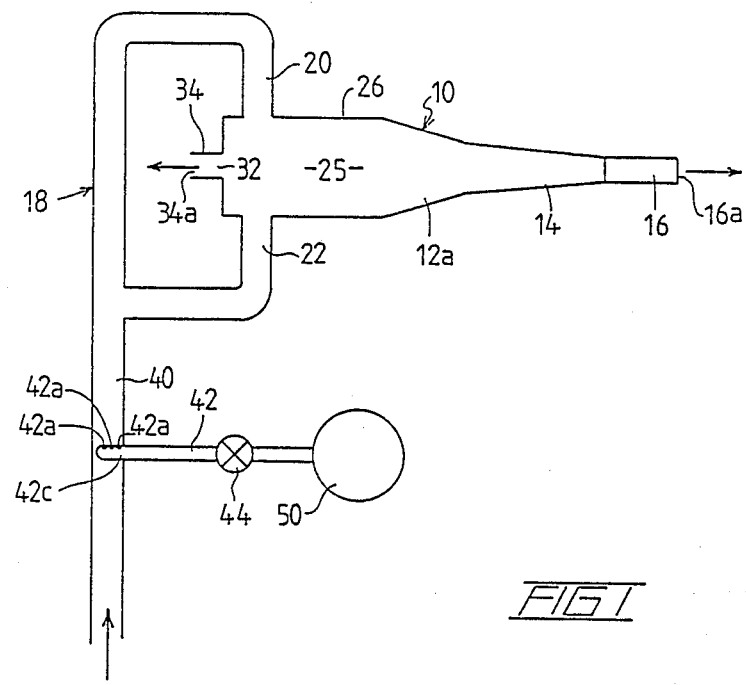

United States Patent [19]

Carroll et al.

[11] Patent Number: 4,816,165
[45] Date of Patent: Mar. 28, 1989

[54] LIQUID SEPARATING METHOD

[75] Inventors: Noel Carroll, Sherbrooke Road, Sherbrooke; Gavan Prendergast, Glen Iris, both of Australia

[73] Assignee: Noel Carroll, Sherbrooke, Australia

[21] Appl. No.: 57,501

[22] Filed: Jun. 3, 1987

Related U.S. Application Data

[63] Continuation of Ser. No. 740,076, Mar. 29, 1985, abandoned.

[51] Int. Cl.⁴ .............................................. B01D 17/05
[52] U.S. Cl. .................................... 210/708; 210/723; 210/727; 210/788
[58] Field of Search ............... 210/702, 703, 705, 708, 210/738, 787, 788, 198.1, 199, 221.2, 512.1, 512.2, 723, 727

[56] References Cited

U.S. PATENT DOCUMENTS

| | | | |
|---|---|---|---|
| 3,121,680 | 2/1964 | Ciabattari | 210/703 |
| 3,557,956 | 1/1971 | Braun et al. | 210/788 |
| 3,684,093 | 8/1972 | Kono et al. | 210/788 |
| 3,929,633 | 12/1975 | Visman et al. | 210/788 |
| 4,094,783 | 8/1977 | Jackson | 210/788 |
| 4,237,006 | 12/1980 | Coleman et al. | 210/788 |
| 4,397,741 | 8/1983 | Miller | 210/221.2 |
| 4,622,150 | 11/1986 | Carroll | 210/788 |

FOREIGN PATENT DOCUMENTS

| | | |
|---|---|---|
| 10359/52 | 10/1954 | Australia . |
| 6887/66 | 12/1967 | Australia . |
| 25813/77 | 7/1980 | Australia . |
| 63784/80 | 5/1981 | Australia . |
| 517323 | 8/1976 | U.S.S.R. . |
| 789403 | 12/1980 | U.S.S.R. . |
| 867421 | 9/1981 | U.S.S.R. . |
| 1012993-A | 4/1983 | U.S.S.R. . |

OTHER PUBLICATIONS

A, I, Ch, E. Journal, vol. 2, No. 4, Dec. 1956, D. J. Simkin and R. B. Olney, "Phase Separation and Mass Transfer in a Liquid-Liquidcyclone", see pp. 545 to 551.

Primary Examiner—Peter Hruskoci
Attorney, Agent, or Firm—Ladas & Parry

[57] ABSTRACT

Separating apparatus for separating components of a liquid mixture one from the other and method of separating such components.

Liquid mixture to be separated is passed via inlet means (18) including a duct (40), to tangential inlets (20, 22) of a cyclone separator (10) so that the less dense component of the mixture emerges from an overflow outlet (34a) of the separator (10) and the more dense component emerges from an underflow outlet (16a) of the separator. Gas is entrained in the incoming liquid mixture in duct (40) by expressing the gas into the duct via a manifold (42a) having openings (42a). The gas is admitted under conditions of relatively high pressure of incoming mixture in duct (40) whereby to substantially dissolve in the mixture whereby to come out of solution in the form of fine bubbles under pressure reduction occurring inside the separator (10).

6 Claims, 2 Drawing Sheets

LIQUID SEPARATING METHOD

This is a continuation of co-pending application Ser. No. 740,076, filed Mar. 29, 1985, now abandoned.

This invention relates to separating apparatus for separating components of a liquid mixture one from the other, and to a method of separating such components.

U.S. Pat. No. 4,237,006 describes a cyclone separator suitable for separating less dense and more dense components from a liquid mixture. For example, the separator is suitable for separating oil and water components from oily water. In operation of such separators, the heavier component, for example water, emerges from a downstream outlet at one axial end of the separator and the less dense component, for example oil, emerges from an upstream outlet. It is of course desirable that the emergent liquid at each outlet be as pure as possible. In the specification of International Application No. PCT/AU83/00028 I describe means whereby the contamination of the heavier component, emerging from the downstream outlet, by the lighter component, is minimised. It is an object of this invention to provide means whereby contamination of the lighter component, emerging from the upstream outlet, by the heavier component, can be reduced.

In one aspect, the invention provides a method of separating components in a liquid mixture one from the other by admission of the mixture into a cyclone separator, wherein gas is entrained in the mixture prior to said admission. The gas is preferably dissolved in the mixture under conditions of relatively high pressure in said mixture prior to said admission, whereafter the mixture is subjected to a decrease in pressure thereof whereby to cause the formation of gas bubbles in the mixture by emergence of said gas from solution. The pressure reduction may be effected prior to said admission or afterwards, such as in the separator itself. Coagulating agents may also be added to the mixture prior to said admission to facilitate the separating action.

In another aspect, the invention provides liquid separating apparatus for separating components of a liquid mixture one from the other, comprising a cyclone separator and inlet means for inlet of the mixture to the cyclone separator, said inlet means including means for entraining gas in the mixture. Preferably, the apparatus is arranged so that said entrainment is effected by dissolving the gas in the mixture. It is preferred that the apparatus be arranged whereby to cause a pressure drop in said mixture after said entrainment whereby to cause gas bubbles to be formed in the mixture by virtue of emergence of the gas from solution.

In yet another aspect of the invention, there is provided a method of separating liquid components in a liquid mixture, one from the other, comprising entraining gas in the mixture, after the entraining admitting the mixture to a cyclone separator of the kind having a tapered elongate axially extending separating chamber with a side inlet at the larger diameter end of the separating chamber, an axial overflow outlet at the larger diameter end and an underflow outlet at the smaller diameter end, separating the liquid mixture within the separating chamber into a more dense liquid component and a less dense liquid component, exiting the more dense liquid component from the separating chamber via the underflow outlet and the less dense component from the separating chamber via the overflow outlet.

Figure 2:
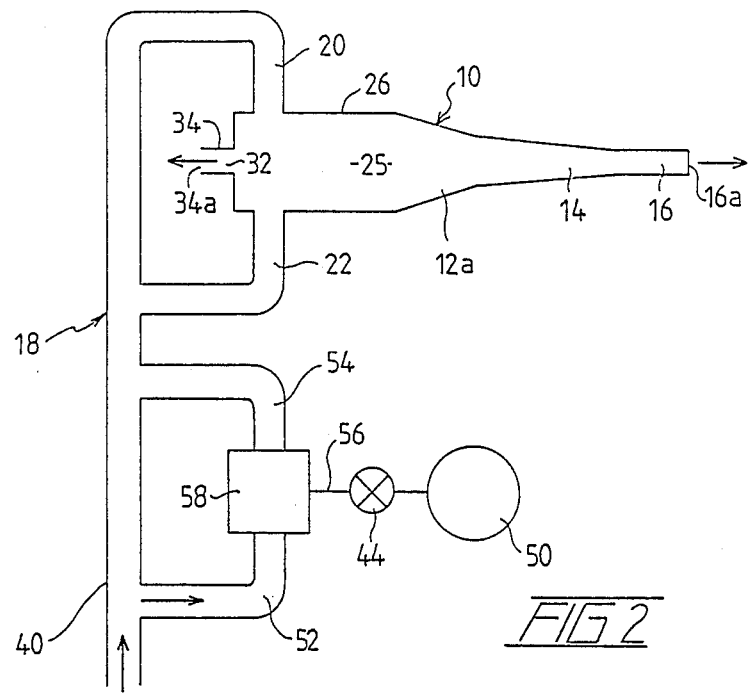

The invention is further described by way of example only with reference to the accompanying drawings in which FIG. 1 is a diagram illustrating a separating apparatus constructed in accordance with the invention; and FIG. 2 is a diagram illustrating an alternative separating apparatus in accodance with the invention.

The liquid separating apparatus shown in FIG. 1 comprises a cyclone separator 10 having a separating chamber 25 defined by an outer casing 26. Apparatus 8 also includes inlet means 18, for supply of liquid mixture to the separator. The casing 26 of separator 10 defines first, second and third cylindrical portions of the separating chamber, these being indicated by reference numerals 12, 14, 16 respectively. The portions 12, 14, 16 are of progressively decreasing diameters. Portion 14 in this instance has a slight taper and is preferably at least ten times as long as its maximum diameter. Portion 14 is interconnected with portion 12 by a tapered intermediate portion 12a. Two feed inlets 20, 22 are provided for tangential inlet of liquid to the chamber 25 at portion 12 thereof. An axial outlet pipe 34 is provided, this opening to portion 12 at an aperture 32. Liquid admitted to the chamber 25 from inlet means 18 and via inlets 20, 22 is subjected to centrifical action whereby the less dense component emerges at an upstream outlet 34a, at the end of outlet pipe 34 and the more dense component travels lengthwise along the chamber 25 through portions 12, 14, 16 to emerge from a downstream outlet 16a at the end of portion 16. The separator 10 may be of the form described in the aforementioned U.S. Pat. No. 4,237,006, the disclosures of which are hereby incorporated into the present specification to form part thereof. This separator is essentially characterised in that the portion 14 thereof is relatively long compared with its maximum diameter, such as at least ten times as long. The separator may also be modified such as described in the specification of my aforementioned International Application No. PCT/AU83/00028, the disclosures of which are likewise incorporated into the present specification to form part thereof.

Feed inlets 20, 22 communicate with an inlet duct 40 forming part of inlet means 18 and into which the liquid to be separated is passed for admission to the separator 10.

A tube 42, also forming part of inlet means 18, has a portion defining a manifold 42c which extends radially into duct 40 from the side thereof and is sealed where it passes into the duct 40. Tube 42 extends away from duct 40 and communicates via a valve 44 with a source 50 of pressurized gas. As liquid to be separated is passed along duct 40, valve 44 is open to pass pressurized gas from source 50 through tube 42 to emerge, via holes 42a in manifold 42c, into the incoming liquid stream.

The liquid to be separated is admitted to duct 40 under some pressure, but the pressure drops thereafter through the inlets 20, 22. The entrainment of gas from openings 42a is arranged to be such that the gas or a substantial part thereof is dissolved in the liquid. The amount of so dissolved gas is however preferably arranged to be close to the maximum quality which can be so dissolved at the prevailing pressure of the liquid and, accordingly, as the liquid pressure drops due to flow through inlets 20, 22 and further, as the liquid enters the separating chamber 25, the excess dissolved air comes out of solution to form gas bubbles in the liquid. It has been found that these gas bubbles facilitate the separation of the components of the liquid, particularly where the admitted liquid is oily-water and where separation of the oil and water components is to be effected by the separator 10. More particularly a reduction in the relative contamination of the lighter component emerging from upstream outlet 34a, by the heavier component, is achieved.

The drop in liquid pressure after liquid emerges from duct 40 may be brought about in any known manner such as by appropriate selection of the cross sectional areas of the inlets 20, 22 or portions thereof, in particular by incorporation therein of suitable venturis.

In order to further facilitate the separating action, suitable coagulating agents may be added to the liquid in duct 40, such as by addition of ferric chloride to make "flock" followed by a suitable polyelectrolyte admitted further down stream. Such agents may be introduced at a concentration in the range 4-80 ppm.

It has not been found essential that, in the apparatus of FIG. 1, the entrained gas should be completely dissolved in the incoming liquid stream in duct 40. More particularly, the gas may be introduced in the form of bubbles, preferably of diameter less than 10 microns.

In the modification shown in FIG. 2, the separator 10 and inlets 20, 22 are of the same form as described in relation to FIG. 1 and like components in FIGS. 1 and 2 have like reference numerals. In this instance, the inlet means 18 is, however, modified by omission of the tube 42. Instead, a portion of the flow through duct 40 is diverted through a branch pipe 52 and thence passed through a known device 58 effective to entrain the desired gas in the liquid, after which the liquid leaving the device 58 is returned to duct 40 via a branch pipe 54. Here, the gas may again be supplied from a pressurized source 50 through a valve 44 and a pipe 56 in the manner previously described. By use of the known device 58, it is possible to better effect complete dissolving of gas in the liquid.

While the arrangements may utilize air as the introduced gas, it is of course possible to use other gases and the invention is not to be construed as being limited to use of air only.

In practising the invention in the instance where substantially complete dissolving of gas is effected in the incoming liquid stream, it has been found practicable to entrain up to thirty percent by volume of gas in the entrained liquid. In a particular example where the incoming liquid in pipe 40 comprised saline water at an inlet pressure of 3,000Kpa and at 80° C., it was found feasible to dissolve 6,000 cc of hydrocarbon gas per liter of saline water, referenced to standard conditions (25° C.; atmospheric pressure).

The described arrangement has been advanced merely by way of explanation and many modifications may be made thereto without departing from the spirit and scope of the invention as defined in the appended claims.

We claim:

1. A method of separating liquid components in a liquid mixture including a dense liquid component and a less dense liquid component, comprising:
   entraining gas in the mixture, after said entraining admitting the mixture through at least one tangential inlet to a cyclone separator of the kind having a tapered elongate axially extending separating chamber including first, second, and third portions of progressively decreasing diameters, wherein said second portion is at least ten times as long as its maximum diameter, said inlet being located at the larger diameter end of the separating chamber, an axial overflow outlet at the larger diameter end and an underflow outlet at the smaller diameter end, wherein a sufficient amount of said gas is dissolved in the mixture under conditions of relatively high pressure in said mixture prior to admitting said mixture to said inlet, and the mixture is subjected to a decrease in pressure thereof to cause the formation of gas bubbles in the mixture by emergence of said gas bubbles from solution to facilitate the separation of said liquid components, separating the liquid mixture within the separating chamber into a more dense liquid component and a less dense liquid component, exiting the more dense liquid component from the separating chamber via the underflow outlet and the less dense component from the separating chamber via the overflow outlet.

2. A method of separating components as claimed in claim 1 wherein said pressure reduction is effected prior to admitting said mixture to said inlet.

3. A method of separating components as claimed in claim 1 wherein said pressure reduction is effected after admitting said mixture to said inlet.

4. A method of separating components as claimed in claim 3 wherein said pressure reduction is effected in said separator.

5. A method of separating components as claimed in claim 1 comprising adding coagulating agents to said mixture prior to admitting said mixture to said inlet to facilitate the separating action.

6. A method of separating components as claimed in claim 1 wherein said gas is introduced in the form of bubbles of less than 10 micron diameter.

* * * * *